(12) United States Patent
Frohlund

(10) Patent No.: US 6,280,258 B1
(45) Date of Patent: *Aug. 28, 2001

(54) ARRANGEMENTS RELATING TO ELECTRICAL CONNECTIONS BETWEEN APPARATUSES CONTAINING ELECTRICAL CIRCUITRY

(75) Inventor: Stig Frohlund, Hässleholm (SE)

(73) Assignee: Telefonaktiebolaget LM Ericsson (publ), Stockholm (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/257,165

(22) Filed: Feb. 24, 1999

(30) Foreign Application Priority Data

Feb. 26, 1998 (SE) ................................................ 9800588

(51) Int. Cl.$^7$ ...................................................... H01R 13/24
(52) U.S. Cl. ............................................... 439/700; 439/31
(58) Field of Search .................................... 439/700, 164, 439/165, 660, 188, 310, 824, 31; 455/575, 90, 128, 347, 351, 89

(56) References Cited

U.S. PATENT DOCUMENTS

| | | | |
|---|---|---|---|
| 3,771,110 | * 11/1973 | Reed ..................... | 439/824 |
| 4,200,351 | * 4/1980 | Long et al. ............ | 439/824 |
| 5,001,659 | 3/1991 | Watabe ................. | 364/708 |
| 5,237,488 | 8/1993 | Moser et al. .......... | 361/729 |
| 5,259,019 | * 11/1993 | Stilley ................... | 379/58 |
| 5,308,252 | * 5/1994 | Mroczkowski et al. | 439/66 |
| 5,310,352 | 5/1994 | Mroczkowski et al. | 439/76 |
| 5,358,411 | 10/1994 | Mroczkowski et al. | 439/66 |
| 5,382,169 | * 1/1995 | Bailey et al. .......... | 439/76 |
| 5,509,813 | * 4/1996 | Lu ......................... | 439/79 |
| 5,548,824 | * 8/1996 | Inubushi et al. ...... | 455/90 |
| 5,649,309 | * 7/1997 | Wilcox et al. ......... | 455/90 |
| 5,681,187 | * 10/1997 | Fukushjima et al. . | 439/700 |
| 5,723,331 | * 3/1998 | Harms ................... | 455/90 |
| 5,746,606 | * 5/1998 | Sobhani ................ | 439/21 |

FOREIGN PATENT DOCUMENTS

| | | |
|---|---|---|
| 4344272 A1 | 6/1994 | (DE) . |
| 0 720 339 A2 | 7/1966 | (EP) . |
| 0 765063 A2 | 3/1997 | (EP) . |
| 0836308 A1 | 4/1998 | (EP) . |
| 2-44843 | 2/1990 | (JP) . |
| 7-45102 | 12/1995 | (JP) . |
| 09-130462 | 5/1997 | (JP) . |
| 10-125431 | 5/1998 | (JP) . |
| 11-232965 | 8/1999 | (JP) . |
| 8912945 | 12/1989 | (WO) . |
| WO 9621988 A1 | 7/1996 | (WO) . |
| WO 98/33309 | 7/1998 | (WO) . |
| 98/02437 | 3/1999 | (WO) . |

* cited by examiner

Primary Examiner—Gary Paumen
Assistant Examiner—Ross Gushi
(74) Attorney, Agent, or Firm—Jenkens & Gilchrist, P.C.

(57) ABSTRACT

It is shown an electric connector for enabling galvanic contact between a contact pad of a first electric device and a contact pad of a second electric device. The connector is mechanically attachable to and detachable from at least the first electric device and comprises a first resilient contact pin connected to a second resilient contact pin. When mechanically attached to at least the first electric device, the first resilient contact pin is in abutment with the contact pad of the first electric device and the second resilient contact pin is in abutment with the contact pad of the second electric device.

28 Claims, 3 Drawing Sheets

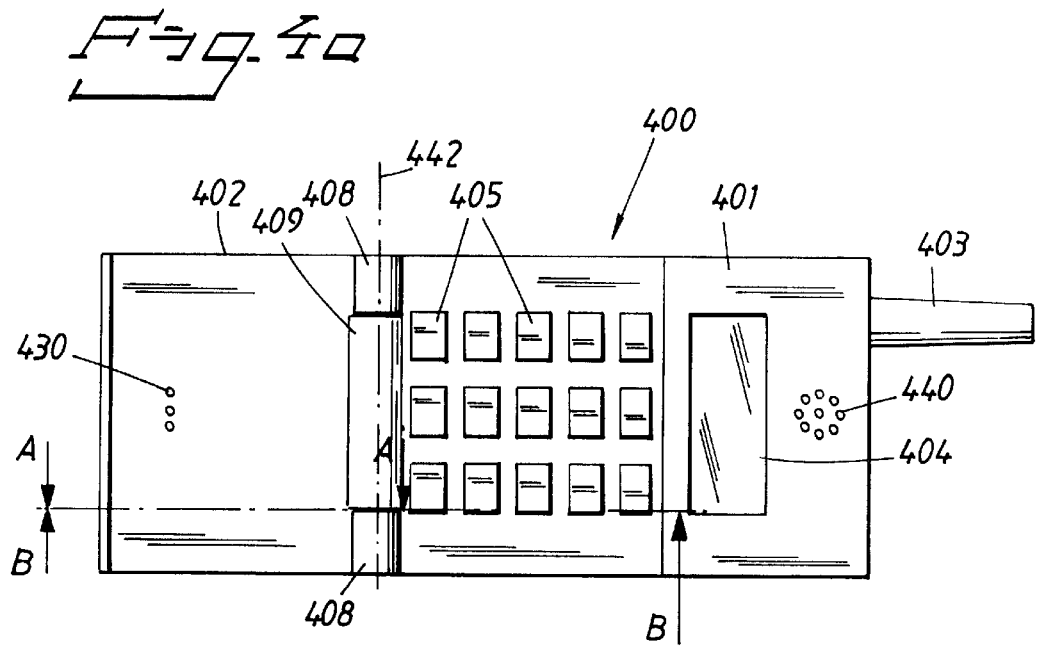
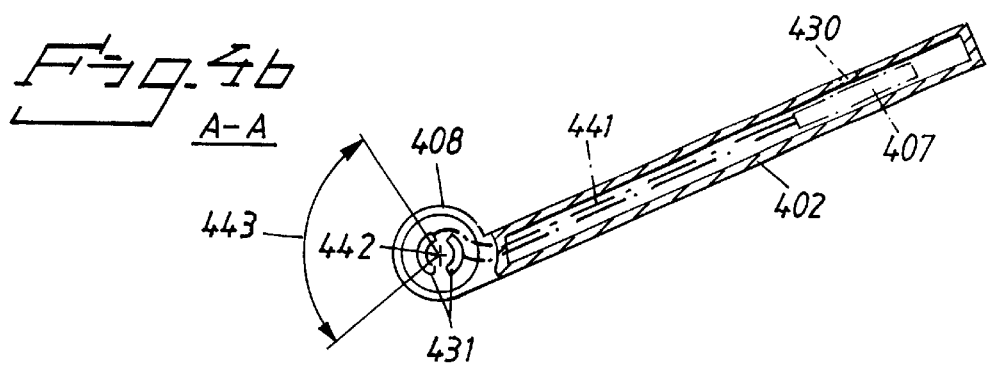
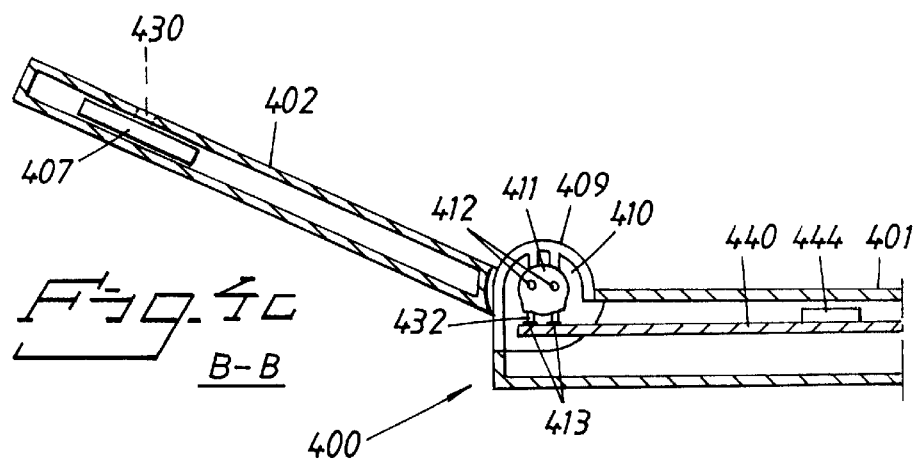

ARRANGEMENTS RELATING TO ELECTRICAL CONNECTIONS BETWEEN APPARATUSES CONTAINING ELECTRICAL CIRCUITRY

TECHNICAL FIELD OF THE INVENTION

The present invention relates to a removable electric connector that enables electric contact between electric devices that are mechanically attachable and detachable from each other.

DESCRIPTION OF RELATED ART

The technical evolution, in terms of features such as weight and size, in the field of portable mobile telephone terminals has reached a point where physiognomic considerations must be made. Limitations in terms of size of previous generations of mobile terminals were dictated by the size of the components of the terminal, not least the size of the battery pack. Present day terminals, on the other hand, comprise a small number of highly integrated low-power circuits that easily fit inside a palm-sized unit. In fact the dimensions of the smaller among the recently developed terminals are such that the distance between the loudspeaker and the microphone has become an important design factor. In order to further miniaturize the terminals, while still enabling a proper alignment between the loudspeaker/microphone and the ear/mouth of the user, mechanical solutions such as foldable lids and arms comprising a microphone or a speaker have become commonplace.

A problem relating to the foldable and flip-lid equipped terminals, and in fact to any device that comprise electric sub-units that are mechanically separable from each other, is obviously their sensitivity to mechanical abuse. Both in terms of normal every day wear as well as occasional abuse due to carelessness on the side of the user. This problem has led to a requirement of replaceable lids of the terminals and also to a requirement of replaceable connector means between the lid and the device, or between sub-units of devices.

A typical example of the state of the art in this respect is disclosed in the European patent application having publication number EP-0720339, where it is disclosed an electronic apparatus having a hinge structure. A removable hinge connector for connecting circuitry of two casing parts of an electronic apparatus comprises an electrically conductive member in the form of a flexible printed circuit board. Electric contact is enabled via PCMCIA connectors at opposite ends of the printed circuit board.

The connector disclosed in EP-0720339 forms part of a mechanical connector between the two casing parts of the device. In order to enable rotation of the two casing parts, the connector comprises two separate sleeve parts that rotate relative to each other. The conductive member is located within the sleeve parts and is subject to a bending motion when the sleeve parts rotate. It is hence necessary that the conductive member is in the form of a flexible printed circuit board, thus making the connector comprising the circuit board unnecessarily bulky.

Moreover, due to the fact that the coupling portions of the connector disclosed in EP-0720339 are in the form of PCMCIA connectors the connector is not suitable in situations where a small physical size is desirable.

SUMMARY OF THE INVENTION

In view of prior art as discussed above, a number of problems remain to be solved regarding electric connectors for attachable and detachable lids of portable electrical devices, and in fact regarding connector for any electric device comprising of mechanically separable units. Hence, a first problem solved by the present invention is how to provide a connector that enables reliable galvanic contact between separate electrical units while at the same time be of small size and easy to replace.

Another problem solved by the present invention is how to provide an electric connector which enables reliable galvanic contact between mutually rotating electric devices.

The object of the present invention is to overcome the problems as stated above. This is in short achieved by providing a connector as well as a portable device comprising a connector which, when attached between two electric units, is in abutment with contact pads of the units.

In some more detail, it is shown an electric connector for enabling galvanic contact between a contact pad of a first electric device and a contact pad of a second electric device. The connector is mechanically attachable to and detachable from at least the first electric device and comprises a first resilient contact connected to a second resilient contact. When mechanically attached to at least the first electric device, the first resilient contact is in abutment with the contact pad of the first electric device and the second resilient contact is in abutment with the contact pad of the second electric device. It is also shown a portable electric apparatus at which such an electric connector is arranged.

An advantage of the present invention is that it is compact and thus easily implemented as an integral part of a hinge structure between two electric devices.

Another advantage of the present invention is that, by the fact that that it comprises resilient pins, it provides secure galvanic contact between electric devices while at the same time enabling relative motion between two units of an electric device.

Yet another advantage of the present invention is that it provides an easily replaceable connector for a portable device due to the fact that the device does not have to be interfered with during replacement.

BRIEF DESCRIPTION OF THE DRAWINGS

FIG. 4a shows a schematic top view of a mobile telephone terminal having a replaceable lid connected to the terminal via a connector according to the invention.

FIG. 4b shows a schematic cross-sectional view of a lid according to the invention.

FIG. 4c shows a schematic cross-sectional view of a lid and a housing of a telephone comprising a connector according to the invention.

DETAILED DESCRIPTION OF PREFERRED EMBODIMENTS

Figure 1:
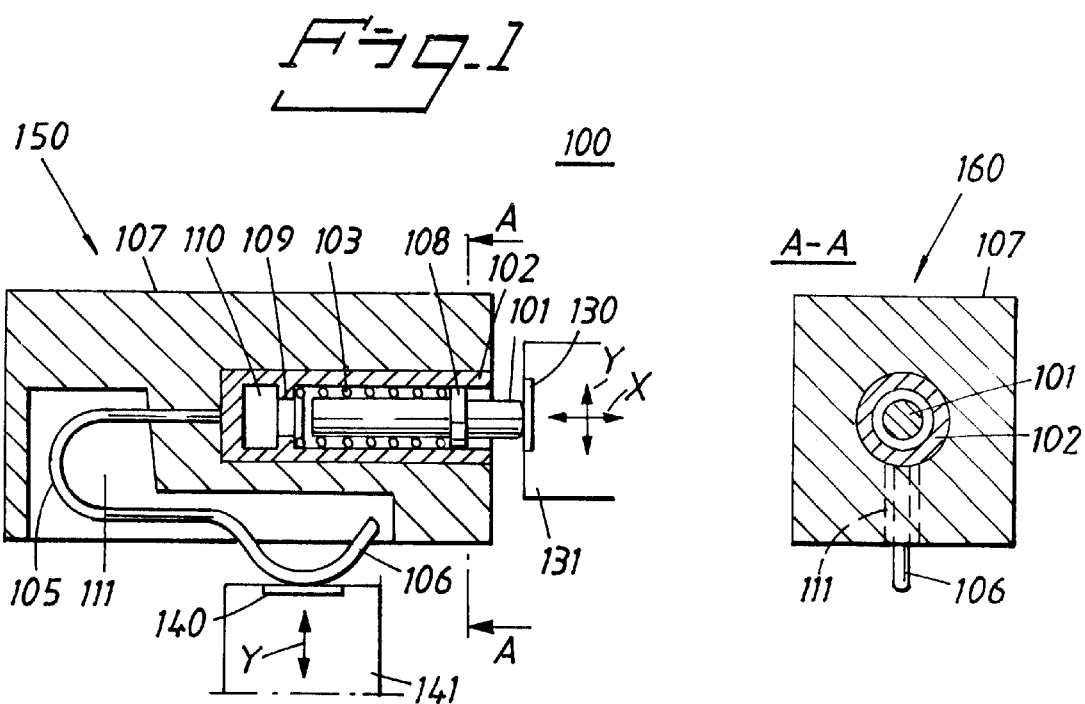
FIG. 1 shows a schematic cross-sectional view of a first embodiment of a connector according to the invention.

A first preferred embodiment of an electric connector 100 according to the invention is shown in FIG. 1. A first cross-sectional view 150 and a second cross sectional view 160 corresponding to a cross-section A—A in the first view 150.

Located within an elongated non-conductive sleeve 107 is a first contact 101 and a second contact 106. The connector 100 galvanically connects a first contact pad 130 of a first electric unit 131 with a second contact pad 140 of a second electric unit 141. The first contact 101 is in abutment with the first contact pad 130 of the first electric device 131 and the second contact 106 is in abutment with the second contact pad 140 of the second electric device 141. Galvanic pins between the pins 101,106 and respective contact pad 130,140 is ensured by the fact that the pins 101,106 are resilient and hence forced into abutment with the pads 130,140.

The electric units 131,141 are not disclosed in any detail and are shown for illustrative purposes only. In fact, the devices 131,141 may be of any type known in the art. Further embodiments described below will contain specific devices such as a mobile telephone.

The first contact 101, occasionally known in the art as a Pogo-pin, is elongated and has a circular cross-section as seen in the A—A view. The pin 101 is concentrically located in a hollow 110 with a circular cross-section of a conductive pin shell 102. The pin 101 is resilient along a first direction X and hence pressing against the first contact pad 130. The resilience of the first contact 101 is accomplished by means of a helical spring 103 which is located concentrically around the first pin 101 and inside the shell 110. A flange 108 on the pin 101 and a shell flange 109 on the inside of the shell 102 provide support for the spring 103. Galvanic contact is maintained between the first pin 101 and the shell 110 through the flanges 108,109 and the spring 103.

The elongated non-conductive sleeve 107 surrounds the first contact 101 to an extent that the first contact 101 partly protrudes out of the sleeve 107. Any particular choice of material of the sleeve 107 is not within the scope of the present invention and is hence not discussed further, although any plastic material known in the art is obviously a reasonable alternative.

The second resilient contact 106 is a conductive elongated thread-like unit with a bent intermediate section 105 connected to the shell 102. Resilience along a second direction Y is ensured by the thread-like structure of the pin 106 and the intermediate part 105 and that it is free to move within a hollow 111 of the sleeve 107 along the second direction Y.

Figure 2:
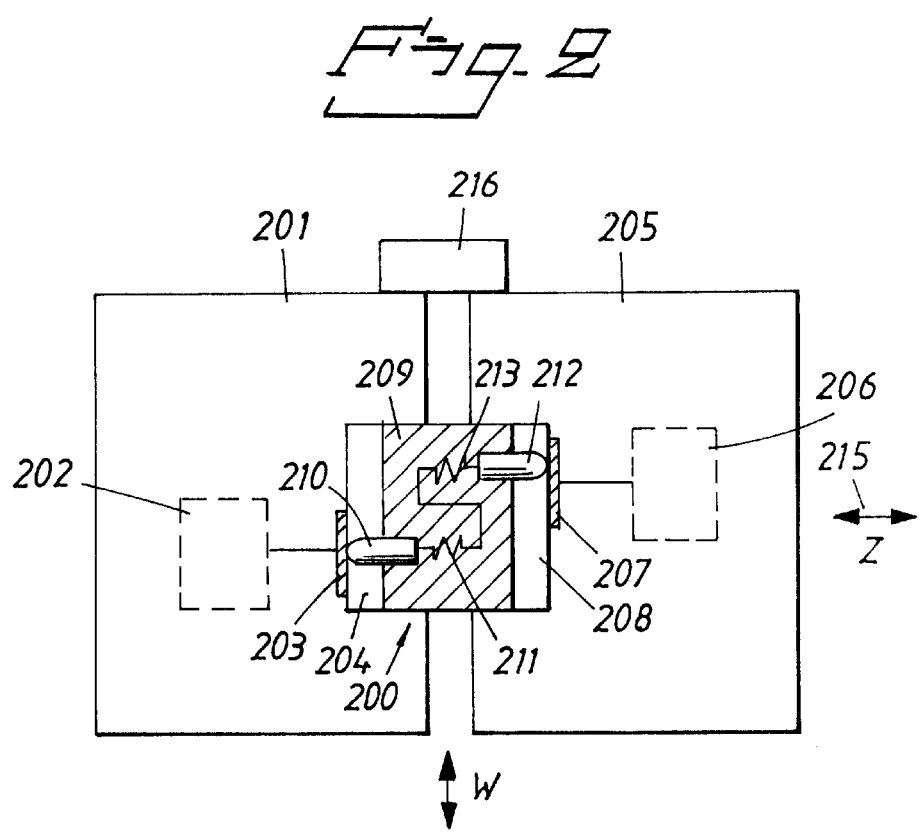
FIG. 2 shows a schematic cross-sectional view of a second embodiment of a connector connecting two electrical devices according to the invention.

FIG. 2 shows an embodiment of the invention where a connector 200 is supplying galvanic contact between a first contact pad 203 of a first electrical device 201 and a second contact pad 207 of a second electrical device 205. The devices 201,205 are mechanically attached to each other by means of a mechanical connector 216. An example of a mechanical connector applicable to an implementation of the present invention is obviously one of a hinge structure of a portable device such as a mobile telephone. The contact pads 203,207 are connected to electric circuitry 202,206 of the devices. The first contact pad 203 is accessible in a recess 204 of the first device 201, and the second contact pad 207 is accessible in a recess 208 of the second device 205.

The connector 200 comprises a body 209 of a shape which enables it to fit snugly in the recesses 204,208 of the devices 201,205. The exact shape of the connector body 209, and also the exact shape of the recesses 204,208 is of limited relevance for the purpose of illustrating the invention and are thus shown as being generally rectangular. Within the body 209 of the connector 200 are located two interconnected resilient contact pin, a first contact pin 210 and a second pin 212. Both pins 210 212 are resilient along a direction Z, as illustrated schematically by spring-like structures 211,213. The pins 210,212 protrude out of the connector body 209 on opposite sides and are located at positions along a fourth direction W corresponding to positions along the W-direction of the contact pads 203,207 in the recesses 204,208.

As in the previous example disclosed in connection with FIG. 1, the spring-like structures 212,213 may be in the form of the resilient structure of Pogo pins or of any other similar construction known in the art.

The connector 200 is easily inserted into or removed from the recesses 204,208. When inserted, the connector 200 is held in position by the fact that the shape of the body 209 corresponds to the shape of the recesses 204,208 and the fact that the resilience of the contact pins 210,212 creates frictional forces between contact pins 210,212 and contact pads 203,207. Also due to the resilience of the contact pins 210,212, any slight relative motion, as allowed by the mechanical connector 216, between the devices 201,205 along any direction Z,W will not detriment the galvanic contact between contact pins 210,212 and contact pads 203,207.

Figure 3:
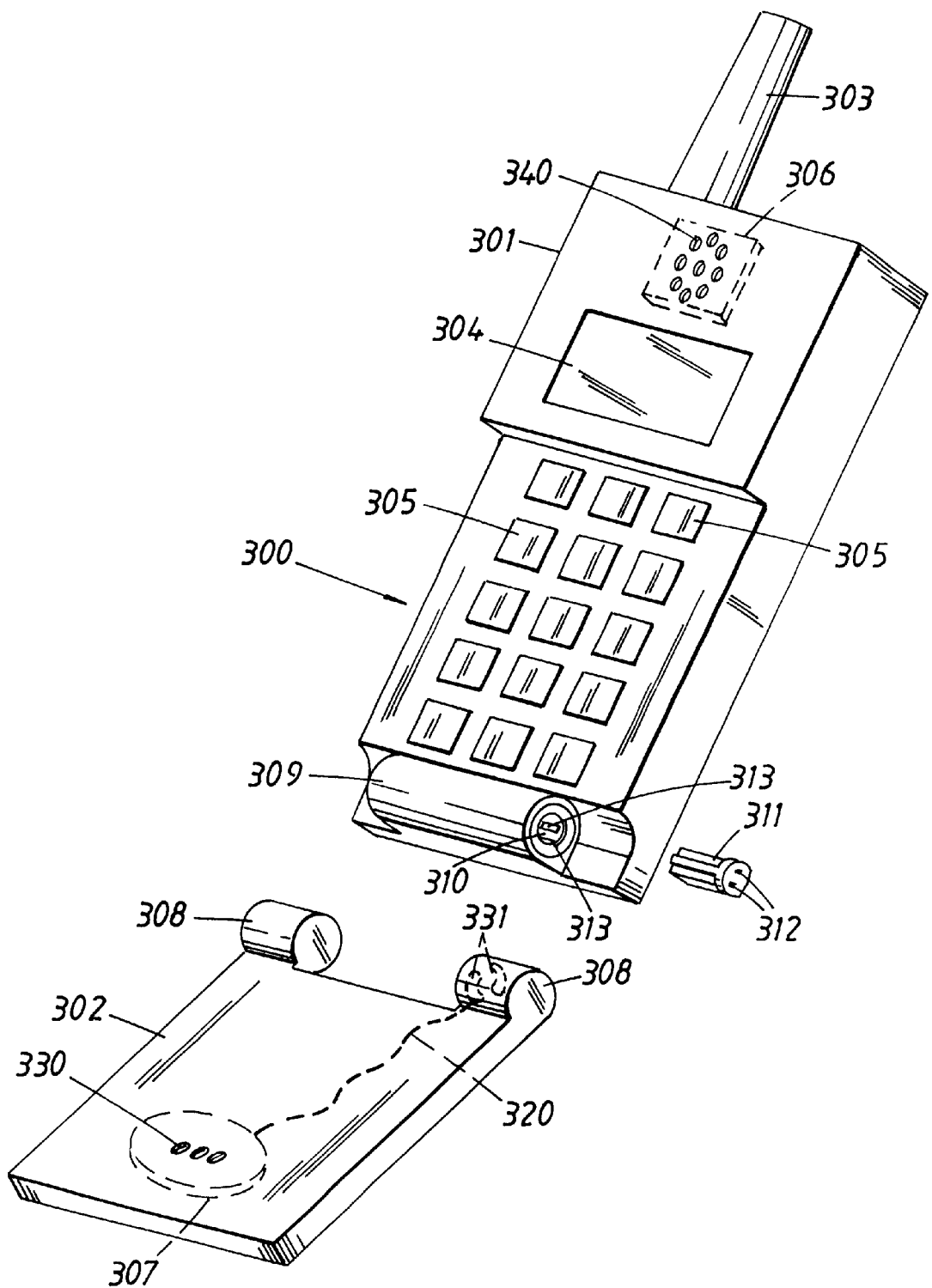
FIG. 3 shows a schematic perspective view of a telephone terminal having a replaceable flip-lid comprising a connector according to the invention.

FIGS. 3 and 4a–c illustrate the present invention as implemented in connection with a portable telephone terminal. In FIG. 3 is shown a perspective view of an electric device in the form of a portable telephone 300 comprising a housing 301 and a removable flip-lid 302. The telephone terminal 300 comprises a number of components that are known in the art and will thus only be discussed briefly. An antenna 303, a speaker 306 located adjacent to holes 340 in the housing, a display 304 and keys 305. The foldable flip-lid 302 is attachable and detachable from the housing 301 by mechanical connection units 308,309, a lid connector 308 and a housing connector 309. The flip-lid is foldable from it's position as indicated by FIG. 3 to a folded position where it partly covers the keys 305 of the telephone 300.

The flip-lid 302 comprises a microphone 307 located adjacent to holes 330 in the lid 302. Within the housing 301 are electrical components (not shown in FIG. 3) that enable a user of the telephone terminal 300 to communicate in a telecommunication network (not shown in the figure) in a manner well known in the art, such as e.g. a cellular GSM mobile telephone network or any other digital or analog network.

The microphone 307 within the flip-lid 302 is electrically connected via an electrical lid lead 320 to the electrical components within the housing 301 through an electrical connector 311. The connector 311 is located within a recess 310 of the housing connector 309 and is capable of being inserted and withdrawn from the recess 310 as is indicated in FIG. 3 by it's withdrawn position. The connector comprises first resilient electrical contact pins 312 and second resilient contact pins (432 in FIG. 4c) and may be of a type disclosed in connection with FIG. 1. The first resilient contact pins 312 are in galvanic contact with lid contact pads 331 located on the mechanical lid connector 308. The second resilient contact (432 in FIG. 4c) are in galvanic contact with terminal contact pads 313 of the circuitry within the housing 301.

It should be noted that the exact shape of the connector 311 is not critical, as long as it fits in the recess 310. It may, for example, be of more or less elongated shape and comprise any knobs or indentations that make it fit snugly in the recess 310.

FIGS. 4a, 4b and 4c illustrate, in more detail, a connection between a microphone 307 and circuitry within a housing 301 of a mobile telephone terminal 400. FIG. 4a shows a top view of the telephone 400. FIG. 4b shows a first cross-sectional view A—A and FIG. 4c shows a second cross-sectional view B—B of the telephone 400 in FIG. 4a.

The telephone 400 comprises, as the example in FIG. 3, components that are well known in the art, and are thus not disclosed in detail. The components include a housing 401 with holes 440 adjacent to an internal speaker (not shown), an antenna 403 for transmission and reception of radio signals, a display 404 and keys 405 acting as a user interface according to known art. A flip-lid 402 is attached to a mechanical connector 409 of the housing 401 by means of mechanical lid connectors 408. As in the previous example, the flip-lid 402 is capable of being rotated around an axis 442 to an extent that it at least partly covers the housing 401. The flip-lid 402 comprises an internal microphone (407 in FIGS. 4b and 4c) behind lid holes 430.

The cross-sectional view A—A in FIG. 4b illustrates the location of lid contact pads 431, such as those lid pads 331 illustrated in FIG. 3. The lid contact pads 431 forms a part of the mechanical lid connector 408 and are elongated to an extent that rotation by an angle 443 of the lid around the axis 442 allows continuous galvanic contact with resilient contact pins (412 in FIG. 4c) of the connector 411, as will be described in connection with FIG. 4c. The lid contact pads 431 are in connection with the microphone 407 through electrical lid leads 441 that may be of any kind known in the art, such as e.g. simple wires or flex-film.

The cross-sectional view B—B in FIG. 4c illustrates the location of the electrical connector 411 within a recess 410 of the mechanical housing connector 409. The housing 401 comprises electrical circuitry 444 mounted on a printed circuit board (PCB) 440. The circuitry 444 comprises circuit contact pads 413 that are located on the PCB 440 at the location of the recess 410 of the mechanical connector 409. The electrical connector 411 is located in the recess 410 and the second resilient contact pins 432 of the electrical connector 411 are resiliently forced against the contact pads 413 on the PCB 440. The first resilient contact pins 412 of the electrical connector 411 are resiliently forced against the lid contact pads (431 in FIG. 4b).

Although preferred embodiments of the system and apparatus of the present invention have been illustrated in the accompanying Drawings and described in the foregoing detailed description, it will be understood that the invention is not limited to the embodiments disclosed, but is capable of numerous rearrangements, modifications and substitutions without departing from the spirit of the invention as set forth and defined by the following claims.

What is claimed is:

1. A mobile telephone terminal comprising:
    a housing;
    a flip-lid being attachable and detachable from said housing; and
    an electrical connector located within a hinge structure interconnecting the housing and the flip-lid including a first resilient contact and a second resilient contact, said first resilient contact being in abutment with a contact pad of said flip-lid and said second resilient contact being in abutment with a contact pad of said housing, wherein said first resilient contact and said second resilient contact maintain contact with said contact pad of said flip-lid and said contact pad of said housing, respectively, without being fixedly attached to said contact pads, wherein said electrical connector forms a part of the hinge structure separate from the housing and the flip-lid that enables a rotating motion between said housing and said flip-lid, wherein during the rotating motion said electrical connector maintains a continuous galvanic contact between said housing and said flip-lid.

2. The mobile telephone terminal according to claim 1, wherein said contact pad of said housing being mounted on a printed circuit board and said contact pad of said flip-lid being electrically connected to a microphone.

3. The mobile telephone terminal according to claim 1, wherein said electrical connector further includes a helical spring being located concentrically around a portion of at least one of said first resilient contact and said second resilient contact.

4. The mobile telephone terminal according to claim 1, wherein said electrical connector further includes an elongated sleeve part within which said first resilient contact and said second resilient contact at least partly protrude therefrom, said first resilient contact having a direction of resilience primarily along a first direction and said second resilient contact having a direction of resilience primarily along a second direction.

5. The mobile telephone terminal according to claim 1, wherein said electrical connector further includes a connector body within which said first resilient contact and said second resilient contact at least partly protrude on opposite sides therefrom, said first resilient contact and said second resilient contact each having a direction of resilience primarily along an axis.

6. An electric connector for enabling galvanic contact between a contact pad of a first electric device and a contact pad of a second electric device, said electrical connector comprising:
    a first resilient contact;
    a second resilient contact connected to said first resilient contact;
    a helical spring being located concentrically around a portion of at least one of said first resilient contact and said second resilient contact; and
    said first resilient contact being in abutment along a first axis with said contact pad of said first electric device and said second resilient contact being in abutment along a second axis with said contact pad of said second electric device when said electrical connector forms a part of a hinge structure that enables a rotating motion about the first axis between the first electric device and the second electric device wherein during the rotating motion said electrical connector maintains a continuous galvanic contact between said first electric device and said second electric device.

7. The electric connector according to claim 6, wherein at least one of said first resilient contact and said second resilient contact comprises a pogo-pin.

8. The electric connector according to claim 6, further comprising an elongated sleeve part within which said first resilient contact and said second resilient contact at least partly protrude therefrom, said first resilient contact having a direction of resilience primarily along a first direction and said second resilient contact having a direction of resilience primarily along a second direction.

9. The electric connector according to claim 6, further comprising a connector body within which said first resilient contact and said second resilient contact at least partly protrude on opposite sides therefrom, said first resilient contact and said second resilient contact each having a direction of resilience primarily along an axis.

10. The electric connector according to claim 8, wherein said elongated sleeve part being non-conductive.

11. The electric connector according to claim 10, further comprising a conductive shell within which said first resilient contact at least partly protrudes therefrom, said conductive shell being at least partly located within said elongated sleeve part.

12. The electric connector according to claim 6, wherein said electric connector being located in a recess of said first electric device.

13. The electric connector according to claim 12, wherein said electric connector being insertable and removable into and out of said recess.

14. An electrical system, comprising:
a first electric device;
a second electric device;
an electric connector including a first resilient contact and a second resilient contact for enabling contact between a contact pad of said first electric device and a contact pad of said second electric device, wherein said first resilient contact being in abutment along a first axis with said contact pad of said first electric device and said second resilient contact being in abutment along a second axis which is not parallel to said first axis with said contact pad of said second electric device when said electrical connector forms a part of a hinge structure that enables a rotating motion about the first axis between said first electric device and said second electric device wherein during the rotating motion said electrical connector maintains a continuous galvanic contact between said first electric device and said second electric device; and
said electric connector comprising a helical spring being located concentrically around a portion of at least one of said first resilient contact and said second resilient contact.

15. The electrical system according to claim 14, wherein said electrical connector further includes a connector body within which said first resilient contact and said second resilient contact at least partly protrude on opposite sides therefrom, said first resilient contact and said second resilient contact each having a direction of resilience primarily along an axis.

16. The electrical system according to claim 14, wherein said electric connector further includes an elongated sleeve part within which said first resilient contact and said second resilient contact at least partly protrude therefrom, said first resilient contact having a direction of resilience primarily along a first direction and said second resilient contact having a direction of resilience primarily along a second direction.

17. The electrical system according to claim 16, wherein said electrical connector further includes a conductive shell within which said first resilient contact at least partly protrudes therefrom, said conductive shell being at least partly located within said elongated sleeve part.

18. The electrical system according to claim 14, wherein said electric connector being located in a recess of said first electric device.

19. The electrical system according to claim 18, wherein said electric connector being insertable and removable into and out of said recess.

20. An electric connector for enabling galvanic contact between a contact pad of a first electric device and a contact pad of a second electric device, comprising:
a first resilient contact pin;
a second resilient contact pin connected to said first resilient contact pin;
an elongated sleeve part, said first resilient contact pin and said second resilient contact pin at least partly located within said elongated sleeve part;
said first resilient contact pin being elongated and having direction of resilience along a first axis parallel to the direction of elongation of said elongated sleeve part, said second resilient contact pin having a direction of resilience primarily along a second axis; and
said electric connector mechanically attachable to at least said first electric device such that said first resilient contact pin is in abutment along said first axis with said contact pad of said first electric device and said second resilient contact pin is in abutment along said second axis with said contact pad of said second electric device, wherein said first resilient contact and said second resilient contact maintain contact with said contact pad of said first electric device and said contact pad of said second electric device, respectively, without being fixedly attached to said contact pads.

21. The electric connector according to claim 20, wherein at least one of said resilient contacts is a pogo-pin.

22. The electric connector according to claim 20, wherein, when mechanically attached to said first electric device, said electric connector is located in a recess of a housing, said recess accessible from without said housing.

23. The electric connector according to claim 22, wherein said electric controller is insertable and removable into and out of said recess.

24. A portable electric arrangement, comprising:
a first electric device;
a second electric device;
a hinge that rotates about a first axis interconnecting said first and second electric devices;
an electric connector for enabling galvanic contact between a contact pad of said first electric device and a contact pad of said second electric device;
said electric connector located substantially along said first axis with said hinge mechanically attachable to and detachable from at least said first electric device, said electric connector further includes:
a first resilient contact pin;
a second resilient contact pin connected to said first resilient contact pin;
an elongated sleeve part, said first resilient contact pin and said second resilient contact pin at least partly located within said elongated sleeve part; and
said first resilient contact pin elongated and having a direction of resilience along the first axis parallel to a direction of elongation of said elongated sleeve part, said second resilient contact pin having a direction of resilience primarily along a second axis; and
said electric connector mechanically attachable to at least said first electric device such that said first resilient contact pin is in abutment along said first axis with said contact pad of said first electric device and said second resilient contact pin is in abutment along said second axis with said contact pad of said second electric device, wherein said first resilient contact pin and said second resilient contact pin are not fixedly attached to said contact pad of said first electric device and said second electric device, respectively.

25. The portable electric arrangement according to claim 24, wherein at least one of said resilient contacts is a pogo-pin.

26. The portable electric arrangement according to claim 24, wherein said portable electric arrangement is a mobile telephone terminal.

27. The portable electric arrangement according to claim 24, wherein, when said electric connector is mechanically attached to at least said first electric device, said electric connector is located in a recess of a housing, said recess accessible from without the housing.

28. The portable electric arrangement according to claim 27, wherein said electric connector is insertable and removable into and out of said recess.

* * * * *

UNITED STATES PATENT AND TRADEMARK OFFICE
CERTIFICATE OF CORRECTION

PATENT NO. : 6,280,258 B1
DATED : August 28, 2001
INVENTOR(S) : Stig Frohlund

It is certified that error appears in the above-identified patent and that said Letters Patent is hereby corrected as shown below:

Column 2,
Line 33, delete second occurrence of "that"; and delete "pins" insert -- contacts --

Column 3,
Line 9, delete "pins between the pins" insert -- contact between the contacts --
Line 10, delete "pins" insert -- contacts --.
Lines 20, 22, 26, 27, 29 and 42, delete "pin" insert -- contact --
Line 65, delete "contact pin, a first contact pin" insert -- contacts, a first contact --
Line 66, delete "second pin 212. Both pins" insert -- second contact 212. Both contacts --

Column 4,
Line 1, delete "pins" insert -- contacts --
Lines 14, 15, 16, 20, 52, 53 and 55, delete "contact pins" insert -- contacts --
Line 57, delete "contact" insert -- contacts --

Column 5,
Lines 22-23, 36 and 38, delete "contact pins" insert -- contacts --

Signed and Sealed this

Seventh Day of May, 2002

*Attest:*

*Attesting Officer*

JAMES E. ROGAN
*Director of the United States Patent and Trademark Office*